United States Patent [19]

Bessho

[11] Patent Number: 5,029,157
[45] Date of Patent: Jul. 2, 1991

[54] DISK PLAYER HAVING A PICKUP SECURING DEVICE

[75] Inventor: Akira Bessho, Saitama, Japan

[73] Assignee: Pioneer Electronic Corporation, Tokyo, Japan

[21] Appl. No.: 271,984

[22] Filed: Nov. 16, 1988

[30] Foreign Application Priority Data

Mar. 4, 1988 [JP] Japan ............................. 63-28784[U]

[51] Int. Cl.$^5$ ..................... G11B 17/00; G11B 17/30
[52] U.S. Cl. .................................. 369/244; 369/215; 369/219
[58] Field of Search ................. 369/244, 215, 79, 34

[56] References Cited

U.S. PATENT DOCUMENTS 4,143,409  3/1979  Iwabuchi et al. ................... 360/106
4,914,647  4/1990  Ono et al. ........................ 369/244 X

FOREIGN PATENT DOCUMENTS

0136051   4/1985  European Pat. Off. .
2738033   3/1979  Fed. Rep. of Germany .
3619515  12/1986  Fed. Rep. of Germany .
0215077  12/1984  Japan ............................. 369/244
0241775  10/1988  Japan ............................. 369/244

Primary Examiner—Stuart S. Levy
Assistant Examiner—Kenneth B. Wells
Attorney, Agent, or Firm—Sughrue, Mion, Zinn, Macpeak & Seas

[57] ABSTRACT

A disk player in which a fixing device fixedly secures a movable member having a pickup disposed thereon such that the movable member will not be accidentally damaged when the disk player is moved. The fixing device comprises: a first rack disposed on the holding member and extending in the direction of movement of the holding member; a second rack extending parallel to the first rack and having a tooth bearing face confronting a tooth bearing face of the first rack; and two leaf springs cantilevered to the supporting mechanism with the free end portions holding the second rack.

3 Claims, 8 Drawing Sheets

DISK PLAYER HAVING A PICKUP SECURING DEVICE

BACKGROUND OF THE INVENTION

This invention relates to a disk player.

The pickup of a disk player is built in a holding member and as the disk rotates the holding member is moved along the recording surface of the disk. Therefore, the disk player has a supporting mechanism for supporting the holding member in such a manner that the holding member is movable along the disk's recording surface, and drive means for moving the holding member. A disk player employing a high-response linear motor as the drive means is well known in the art.

In a disk player using a linear motor, the movable element has a small mass and a quick response. Therefore, when a disk is not being played (i.e., when the power switch for the linear motor is kept turned off), the holding member can move freely. Thus, during movement of the disk player the holding member may crash against the supporting mechanism causing damage to the pickup built therein. For the purposes of eliminating this difficulty, the conVentional disk player is provided with a fixing device which, when the disk player is not in operation, fastens the holding member to the supporting mechanism.

In the conventional disk player, the fixing device has an intricate construction and a correspondingly high manufacturing cost, and sometimes is unreliable in operation.

SUMMARY OF THE INVENTION

In view of the foregoing, an object of this invention is to provide a disk player in which the fixing device is inexpensive to manufacture and reliable in operation.

The foregoing object and other objects of the invention have been achieved by the provision of a disk player comprising: a holding member holding a pickup; a supporting mechanism movably supporting the holding member; high-response drive means for moving the holding member; and fixing means which fixedly secures the holding member to the supporting mechanism, in which, according to the invention, the fixing means comprises: a first rack provided on the holding member such that the first rack extends in the direction of movement of the holding member; a second rack extending in the direction of movement of the holding member and having a tooth bearing face confronting a tooth bearing face of the first rack; and two leaf springs cantilevered to the supporting mechanism in such a manner that the leaf springs are spaced from each other in a direction perpendicular to the tooth bearing faces of the first and second racks, the free end portions of the leaf springs holding the second rack.

The nature, principle and utility of the invention will become more apparent from the following detailed description when read in conjunction with the accompanying drawings.

BRIEF DESCRIPTION OF THE DRAWINGS

In the accompanying drawings:

FIGS. 5 through 7(a), (b) and (c) are diagrams showing parts of the internal structure shown in FIG. 1, respectively;

DETAILED DESCRIPTION OF THE INVENTION

One example of a disk player according to this invention will be described with reference to the accompanying drawings.

A signal recording or reproducing operation is carried out in the disk player with a disk accommodated in a flat cartridge.

As shown in FIGS. 1 through 4, the disk player has a frame 1 which is secured through leg members (not shown) to a player housing (described later). The frame 1 is made of aluminum or aluminum alloy.

A pair of guide members, namely, cylindrical supporting rails 5 and 6 made of steel are secured to the frame 1 such that they extend int eh direction of the arrow Y and are spaced apart from each other in the direction of the arrow Z. Holding member, namely, a pickup body 7 is held between the supporting rails 5 and 6 such that it extends in the direction of the arrow Z and is movably supported by the supporting rails 5 and 6. The pickup body 7 is made of aluminum or aluminum alloy. A pair of steel rollers 8 are provided on one side of the pickup body 7, to roll on the supporting rail 5; whereas two pairs of steel rollers 9 are provided on the other side of the pickup body 7 in such a manner that they are spaced apart from each other in the direction of movement of the pickup body and abut against the supporting rail 6. As shown best in FIG. 4, the pickup body 7 is supported at three points on the supporting rails 5 and 6 through the rollers 8 and 9.

Figure 4:
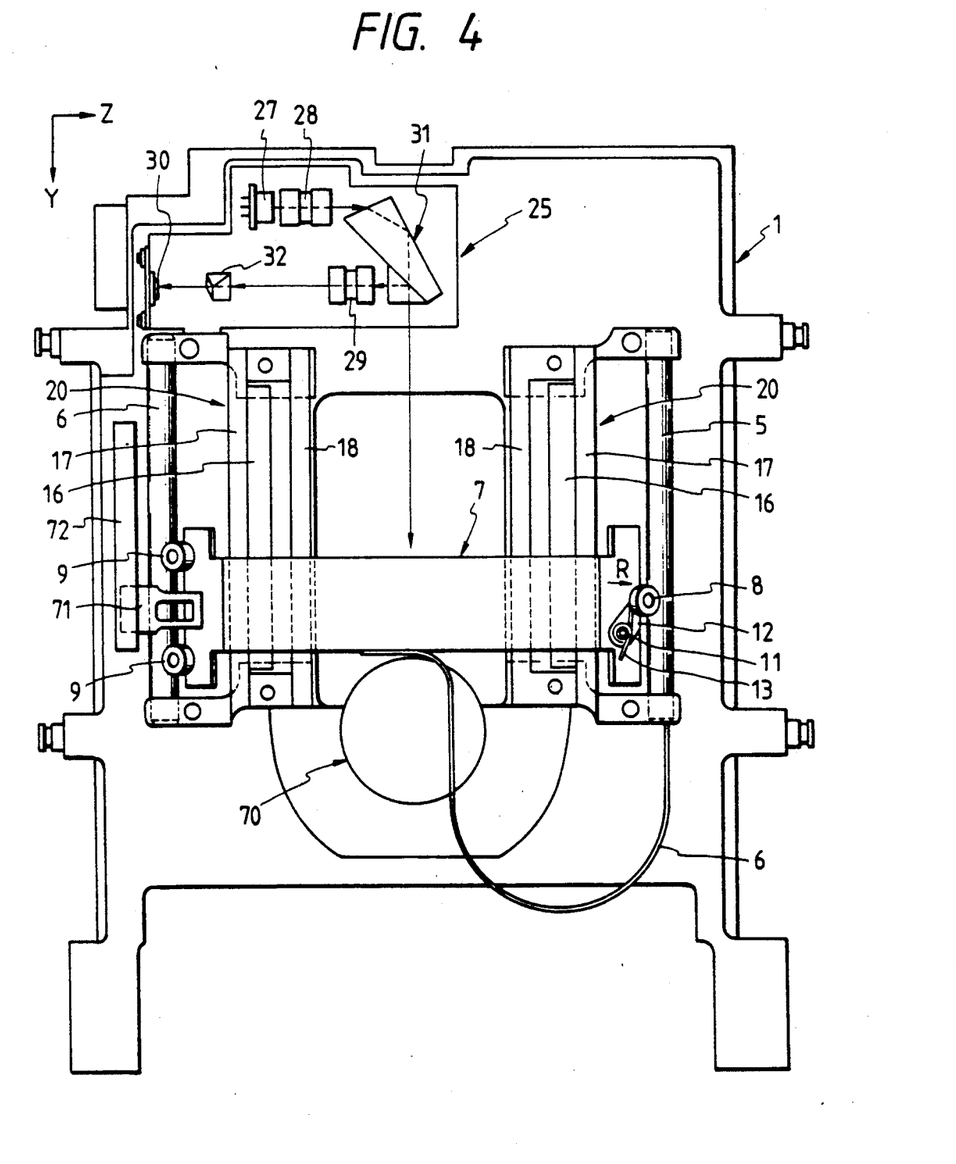
FIG. 4 is a view taken in the direction of the arrows substantially along line IV—IV in FIG. 3.

As shown in FIG. 4, the rollers provided on the one side of the pickup body 7 are mounted on the free end of a swinging lever 12 which is mounted on a pin 11 embedded in the pickup body such that the swinging lever 12 is swingable in the direction of the arrow R. The direction of the arrow R is perpendicular to the direction of movement of the pickup body (or the direction of the Y). The rollers 8 are provided with pushing means, namely, a spring member 13 which pushes the rollers 8 against the supporting rail 5. As the roller 8, provided at one of the three supporting points, are pushed against the supporting rail 5, the two pairs of rollers 9 provided at the other two points are pushed against the supporting rail 6 by the reaction force. The disk player is so positioned that the direction of the arrow Z is opposite to the direction of gravity; that is, the rollers 8 are located above the rollers 9. Thus, the large weight of the pickup body 7 is not applied to the spring member 13 urging the rollers 8 against the supporting rail 5.

The supporting rails 5 and 6, the steel rollers 8 and 9, the spring member 13, and small components relevant thereto form a supporting mechanism which supports the pickup body 7 in such a manner that the pickup body 7 is movable along the recording surface of a recording medium, namely, a disk 15.

Figure 2:
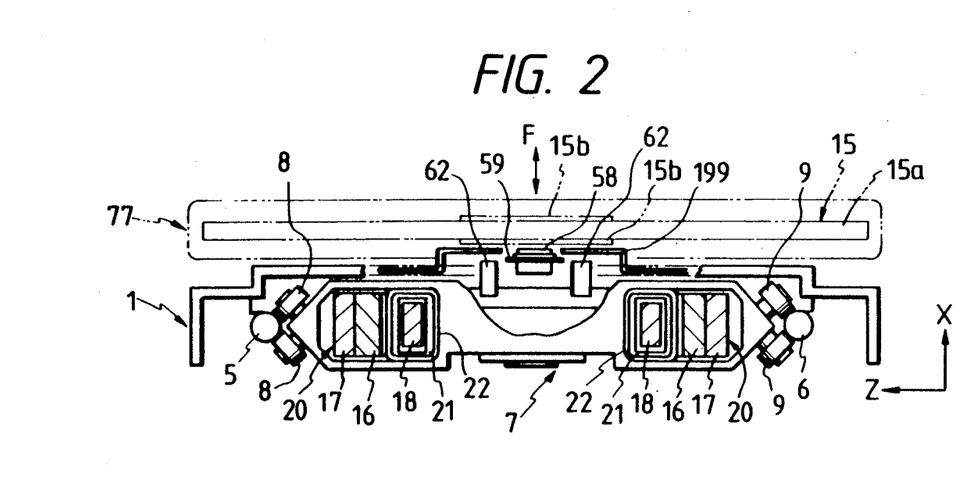
FIGS. 2 and 3 are sectional views taken along lines II—II and III—III in FIG. 1, respectively.

As shown in FIGS. 2 and 4, a pair of elongated magnetic circuits 20 are secured to the frame 1 and extend in the direction of movement of the pickup body (or the direction of the arrow Y). Each of the magnetic circuits 20 comprises an elongated magnet 16 and elongated yokes 17 and 18 in combination. As shown in FIG. 2, a pair of drive coils 21 are secured to the pickup body 7 in such a manner that the central axes of the drive coils 21 are in parallel with the direction of movement of the pickup body 7. The magnetic circuits 20 generate magnetic flux which crosses the drive coils. The magnet circuits 20 and the drive coils form driving means, namely, linear motors for moving a movable optical system including the pickup body 7.

As shown in FIG. 2, a detecting coil 22 is wound on each of the drive coils 21 so that the central axis of the detecting coil 22 is in alignment with the central axis of the drive coil 21. Therefore, the magnetic flux generated by the magnetic circuit 20 of the linear motor crosses the detecting coil 22. The magnetic circuits 20 and the detecting coils 22 form speed detecting means for detecting the speed of movement of the pickup body 7 to thereby control the speed of movement.

Figure 1:
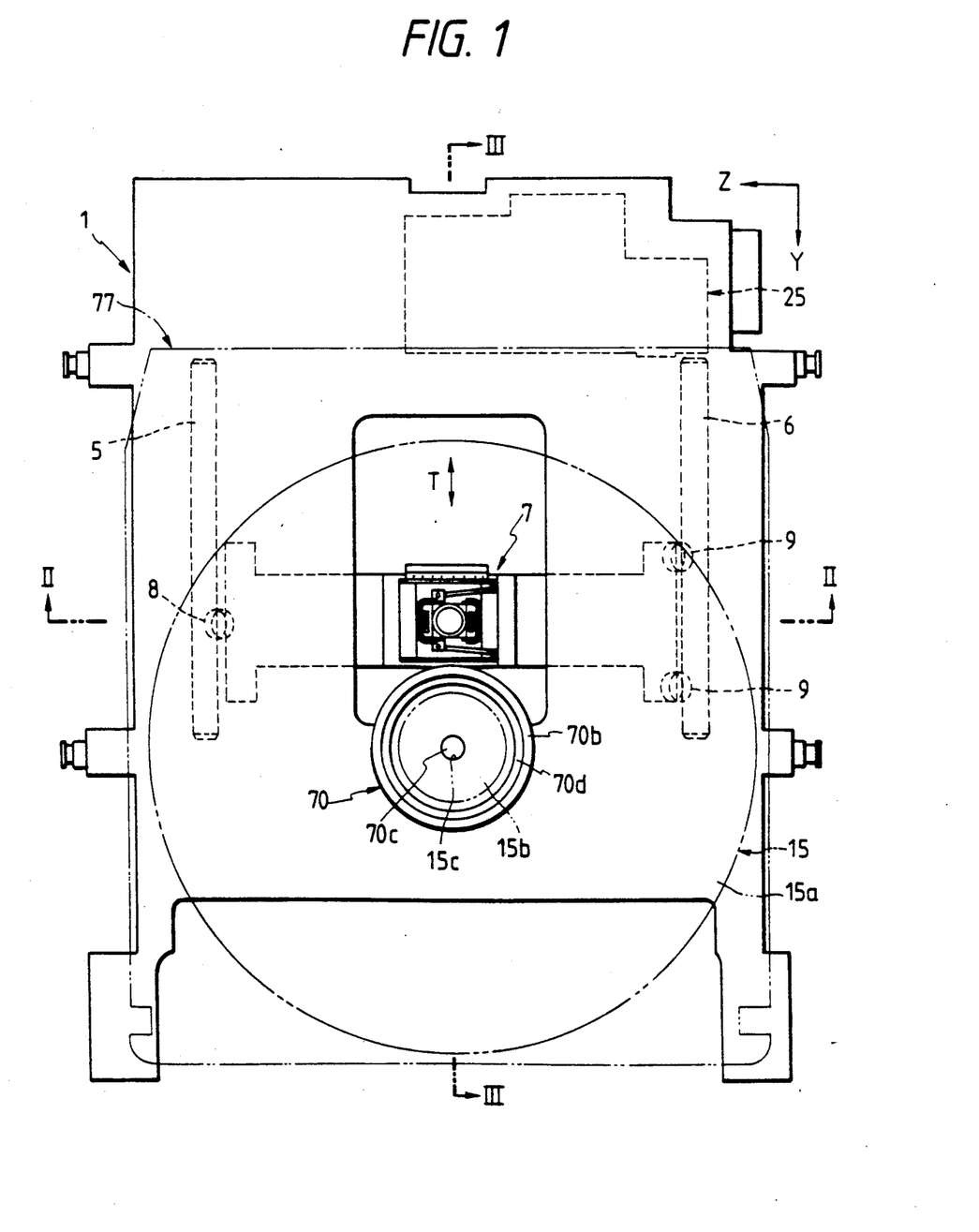
FIG. 1 is a plan view showing an internal structure of a disk player according to this invention.
Figure 3:
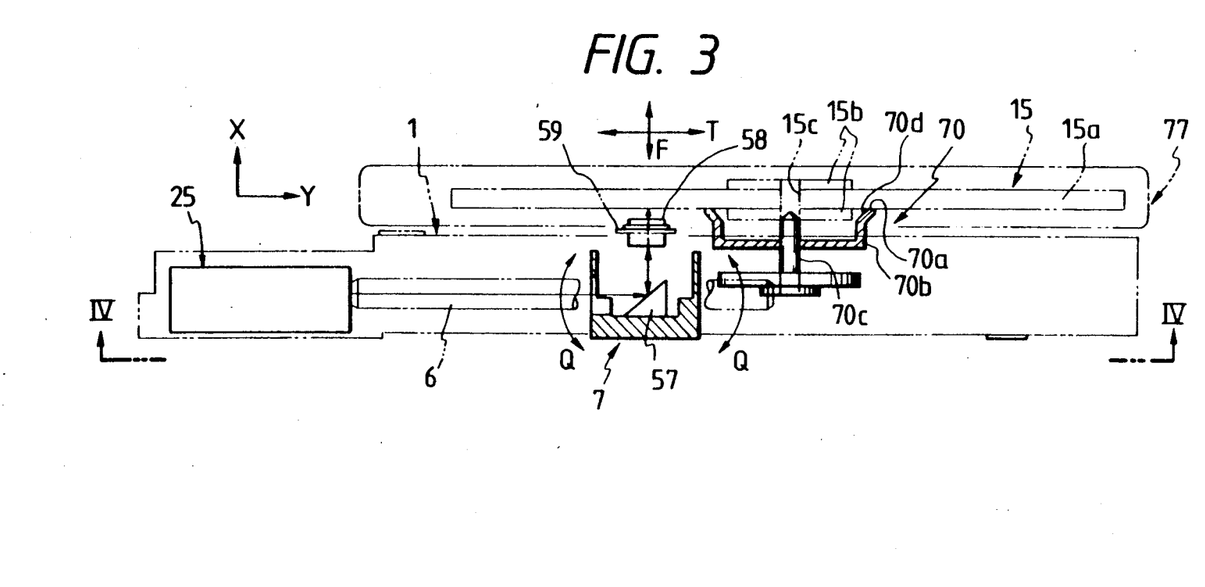

As shown in FIGS. 1, 3 and 4, a relatively flat rectangular-parallelopiped-shaped holding member 25 is provided on the frame 1 at the rear end. The holding member 25 supports: a light emitting element, namely, a laser diode 27; a collimator lens 28 for converting the output rays of light of the laser diode into parallel rays; a condenser lens 29; a light receiving element 30 for finally receiving a light beam reflected from the recording surface of the disk 15 to obtain data signals; a compound prism 31 which shapes the output parallel rays of the collimator lens 28 in irradiation pattern and guides them to an objective lens, and which leads the light beam reflected from the disk's recording surface to the light receiving element 30; and an astigmatism element 32 to give astigmatism to a light beam applied to the disk's recording surface to detect the focus error of the light beam.

As shown in FIG. 3, the pickup 7 has guide means, comprising a total reflection prism 57 for bending at right angles the optical path of the parallel rays provided through the collimator lens 28 and the compound prism 31. As shown in FIGS. 1 and 2 as well, the pickup body 7 is provided with: an objective lens 58 for gathering the parallelrays passed through the total reflection prism 57 into a minute light spot; supporting means including a holder 59 and supporting members 60 (FIG. 5), to support the objective lens such that objective lens is movable along its optical axis (or in the directions of the arrow F) and in a direction perpendicular to the optical axis (or in the directions of the arrow T); drive force applying means including magnetic circuits comprising magnets 62 and coils 63 wound on the holder 59 across which the magnetic flux of the magnetic circuits is extended to drive the objective lens 58 in the above-described two directions; and a base member 64 provided on the pickup body 7, to bear the supporting means and the drive force applying means. The supporting means, the drive force applying means, and the base member 64 form a servo drive mechanism. The servo drive mechanism will drives the objective lens with electromagnetic force.

Figures 5, 6:
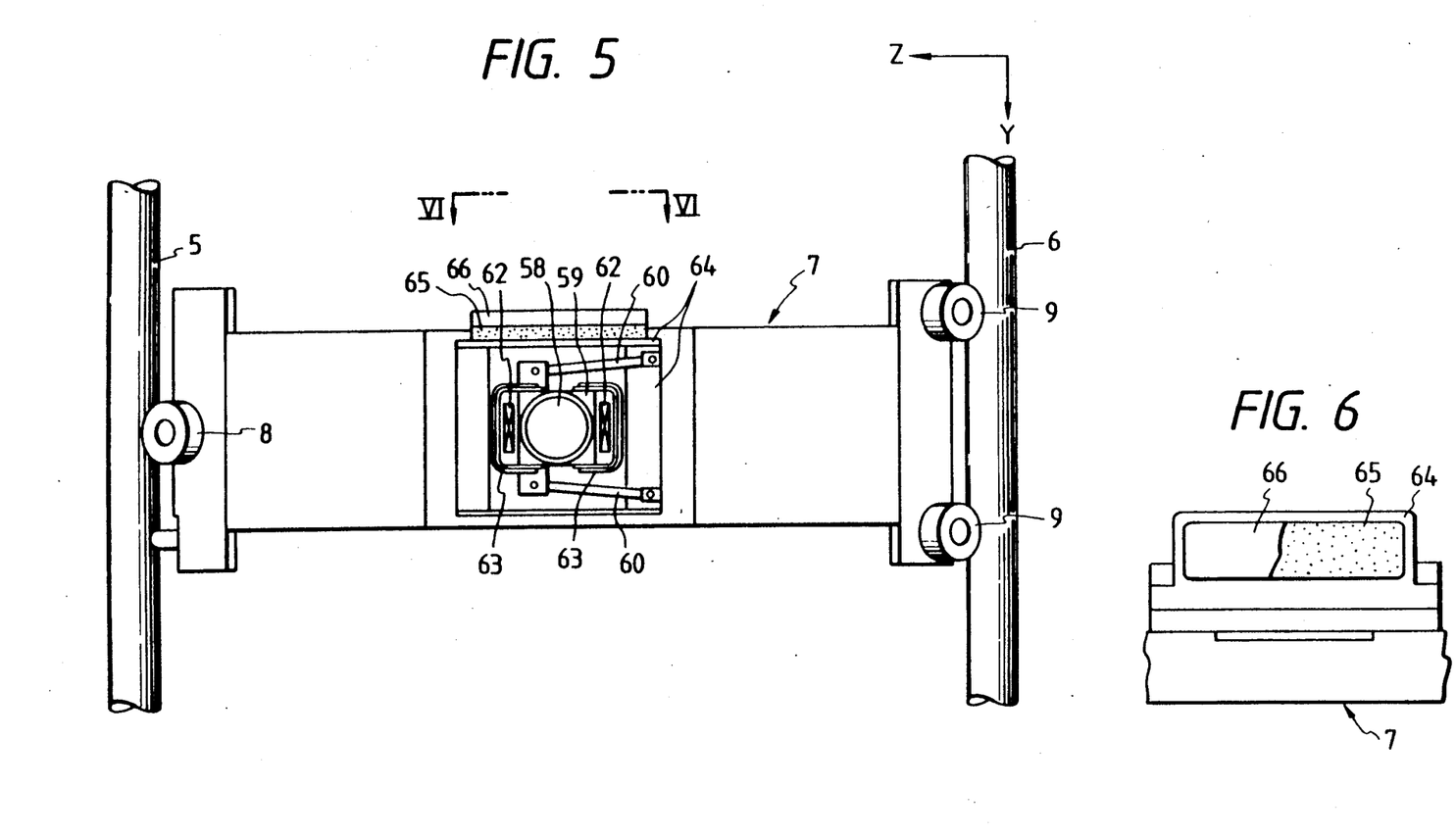

As shown in FIGS. 5 and 6, the base member 64 bearing the supporting means and the drive force applying means is positioned between the pair of supporting rails 5 and 6 adapted to guide the pickup body 7 in such a manner that it is equally spaced from the supporting rails 5 and 6. A weight 66, made of a steel plate or the like, is bonded to the base member 64 through a vibration absorbing member 65, high in internal loss. It should be noted that the weight 66 is provided on the surface of the base member which is perpendicular to direction of movement of the pickup body 7. As the above-described servo drive mechanism operates, the pickup body 7 may have a tendency to resonate, for instance, in the direction of the arrow Q, as shown in FIG. 3. However, since the vibration absorbing member 65 and the weight 66 are provided as described above, the resonance energy is dissipated by the high internal loss of the vibration absorbing member; that is, the resonance is prevented. As the vibration absorbing member 65 and the weight 66 are secured directly to the base member 64 in the above-described manner, the resonance, especially in the direction of the arrow Q, is suppressed efficiently. Furthermore, as the weight 66 is bonded to the surface of the base member which is perpendicular to the direction of movement of the pickup body 7, the vibration absorbing efficiency is maximum.

As shown in FIG. 4, a flexible printed circuit board 68 is provided to supply drive current to the servo drive mechanism installed on the pickup body 7. The printed circuit board is bent in such a manner that it is U-shaped in the direction of thickness, and it is positioned in the range of movement of the pickup body 7 in such a manner that the direction of thickness is parallel with the recording surface of the disk 15. As shown in FIGS. 1 and 3, a turntable 70, on which the disk 15 is held, is provided in front of the pickup body 7.

Figure 7A:
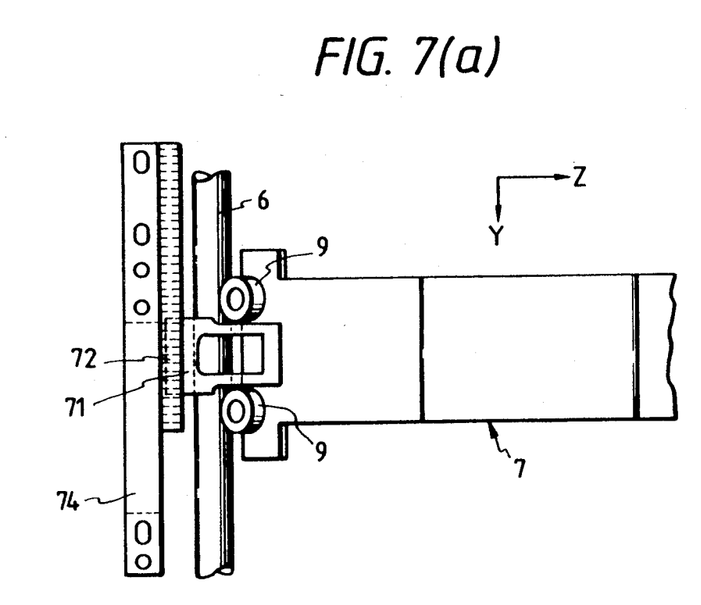
Figure 7B:
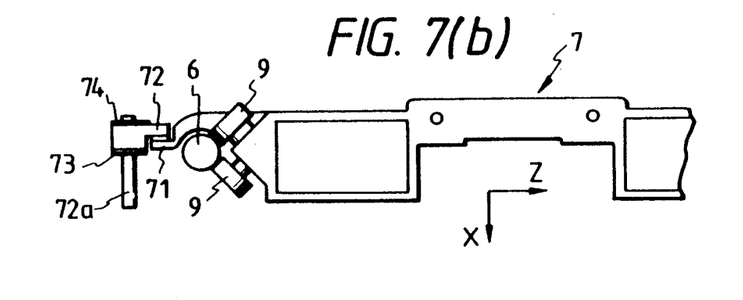
Figure 7C:
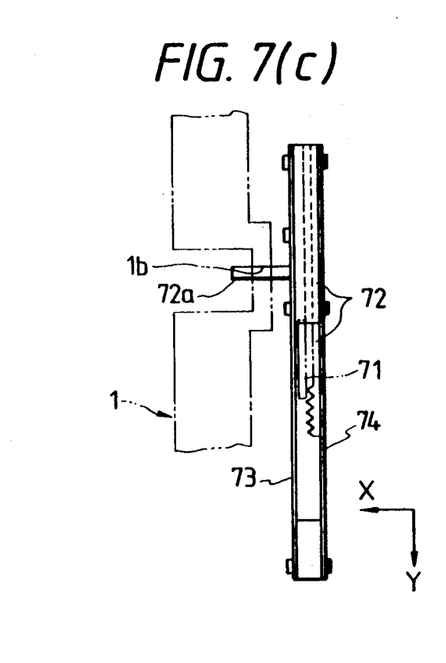

As shown in FIG. 4 and the parts (a), (b) and (c) of FIG. 7, a first rack 71 is provided at one end of the pickup body 7 and extends along the direction of movement of the pickup body 7 (or in the direction of the arrow Y). A second rack 72 is provided near the first rack 71 and covers the entire stroke of movement of the pickup body 7. The tooth bearing face of the second rack 72 is extended in the direction of movement of the pickup body 7 and is confronted with the tooth bearing face of the first rack 71 so that the second rack 72 can be threadably engaged with and disengaged from the first rack 71. As shown in the parts (a), (b) and (c) of FIG. 7, the second rack 72 is held between the free end portions of two cantilevered leaf springs 73 and 74 which are spaced apart in a direction perpendicular (the direction of the arrow X) to the direction in which the tooth; bearing faces of the first and second racks extend and secured thereto, for instance, by peening. The other end portions of the leaf springs 73 and 74 are fixedly secured to the frame 1. The two leaf springs 73 and 74 form a parallel maintaining mechanism. With the aid of the parallel maintaining mechanism, the second rack 72 is moved with respect to the first rack 71 with the tooth bearing faces maintained in parallel with each other. As shown in the parts (b) and (c) of FIG. 7, a guide pin 72a is protruded from the second rack 72 and is slidably engaged in a guide hole 1b formed in the frame 1.

The first and second racks 71 and 72, and the leaf springs 73 and 74 form fixing means for fixing the pickup body 7 to the frame 1 when no disk is played or no data is recorded on the disc. The second rack 72 is so designed to disengage from the first rack 71 by means of a cartridge holder (described later).

Figure 8:
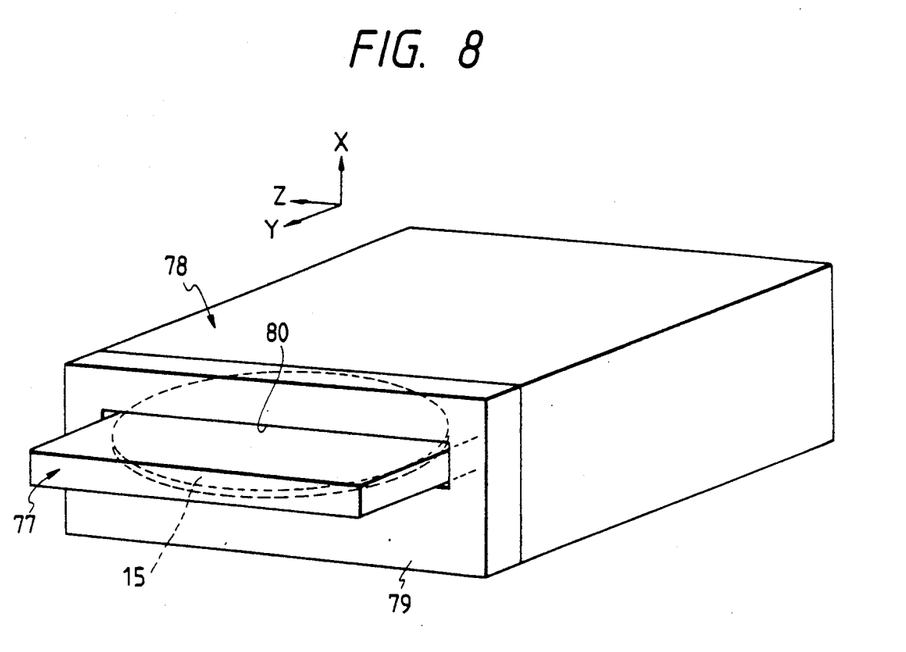
FIG. 8 is a perspective view showing the disk player according to the invention.

As shown in FIGS. 1 through 3, the disk 15 is rotatably accommodated in a cartridge 77. With the disk 15 accommodated in the cartridge 77 in this manner, data is recorded thereon or reproduced therefrom. As shown in FIG. 8, the cartridge 77 and the disk 15 accommodated therein are inserted into a player housing 78 covering the player body through a slot 80 formed in the front panel of the player housing.

A disk conveying mechanism (not shown) is provided to move the cartridge 77 including the disk 15 from the slot 80 to the playing position on the turntable 70, and to move the cartridge 77 back to the slot 80 from the playing position. In addition, disk clamping means is provided to clamp the disk 15 to the turntable 70 which has been set on the latter 70. The disk conveying mechanism has been disclosed, for instance, by Japanese Patent Application No. 65794/1986.

Figure 9A:
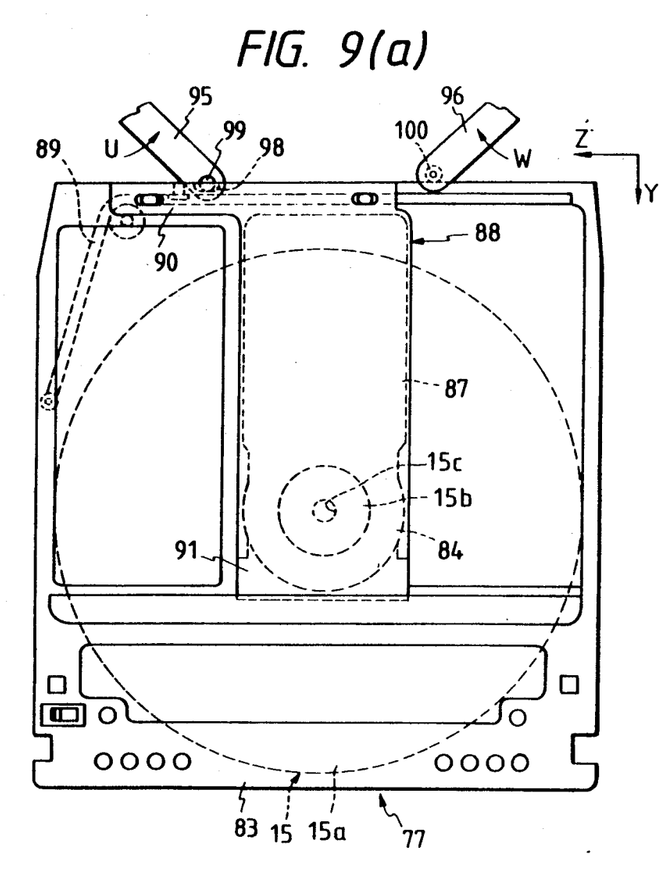
FIGS. 9(a) and 9(b) are a plan view and a side view of a cartridge, respectively.
Figure 9B:
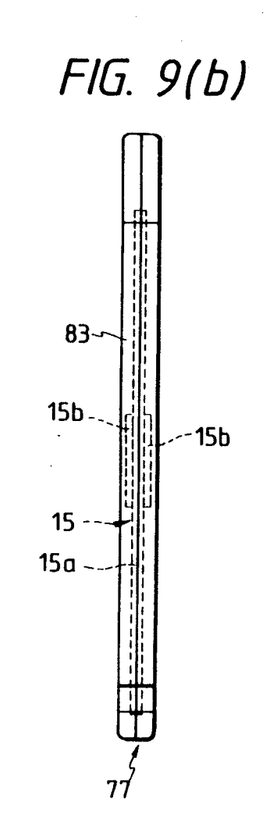

As shown in the parts (a) and (b) of FIG. 9, the cartridge 77 has a body 83 which is substantially in the form of a thin square plate. The disk 15 is rotatably accommodated in the body 83. Substantially circular holes 84 are formed in both major surfaces of the body 83 substantially at the center, thus exposing the central portion of the disk 15. The central portion of the disk 15 is placed on the disk supporting surface 85 (FIG. 3) of the turntable 70 (FIG. 3), for rotation of the disk 15. A substantially rectangular opening 87 is formed in the major surface of the body 83 in such a manner that it communicates with the hole 84, so that the above-described pickup has access to the disk 15 through the opening 87.

The body 83 has a cover 88 to close the opening 87 and the hole 84. The cover 88 is slidable in the direction of the arrow Z and in the opposite direction; that is, it is slidable between the position where it opens and closes the opening 87 and the hole 84. The cover 88 is coupled to urging means, comprising a coil spring 89 which urges the cover 88 (in the direction of the arrow Z) to close the opening 87 and the hole 84.

On the other hand, cover moving means is provided in the player housing 78 which, when the cartridge 77 is inserted into the housing through the slot 80 (FIG. 8). utilizes the force of insertion to move the cover 88 to open the opening 87 and the hole 84. The cover moving means, as shown in the part (a) of FIG. 9, comprises: a pair of lever members 95 and 96 provided in such a manner that they are inclined with respect to a cartridge inserting passageway (in the direction opposite to the direction of the arrow Y) and are swingable about supporting pins (not shown) in the player housing 78 relative to each other; pins 99 and 100 which protrude from the free ends of the lever members and can be fitted in a cut 98 formed in the cover 88; and a coil spring 101 (not shown). When the cartridge 77 is inserted through the slot 80 (FIG. 8) into the housing in the direction opposite to the direction of the arrow Y, the pin of one of the lever members, that is, the pin 99 of the lever member 95 is fitted in the cut 98 formed in the cover 88 as shown in FIG. 9. Therefore, as the cartridge 77 is inserted, the lever member is swung in the direction of the arrow U so that the cover 88 is opened (in the direction opposite to the direction of the arrow Z). On the other hand, the pin 100 of the other lever member is swung in the direction of the arrow W. As the lever member is swung in this manner, the pin 100 slides along the inner edge, thus riding on the cover 88.

The relationships between the disk 15 and the turntable 70 will be described.

As shown in FIGS. 1 through 3, 9(a) and 9(b), the disc 15 comprises: a circular substrate 15a; and a pair of circular hubs 15b secured to both sides of the substrate 15a at the center, respectively. As shown in FIG. 3 and FIG. 9(a), a central through-hole 15c is formed in the disk 15.

On the other hand, the turntable 70, as shown in FIGS. 1 and 3, comprises: a cup-shaped disk-supporting rotary member 70b which supports the disk 15 in such a manner that one of the circular hubs 15b is fitted in the cup-shaped disk-supporting rotary member 70b and the disk 15 is supported on the edge 70a of the opening of the rotary member 15b (FIG. 3); and a centering member, comprising a spindle 70c connected to the cup-shaped disk-supporting rotary member 70b. The spindle 70c is inserted into the central through-hole 15c of the disk 15 to center the disk 15. The inner wall of the cup-shaped disk-supporting rotary member 70b has a tapered surface 70d along the edge of the opening so that the circular hub 15d of the disk 15 can be brought into sliding contact with the tapered surface 70d. Each of the circular hubs 15b is made of magnetic material, so that each hub is attracted by a magnet provided for the turntable so that the disk is clamped to the turntable.

The operation of the disk player thus constructed will be described with reference to FIGS. 10 through 13 in addition to FIGS. 1 through 9.

Figure 10:
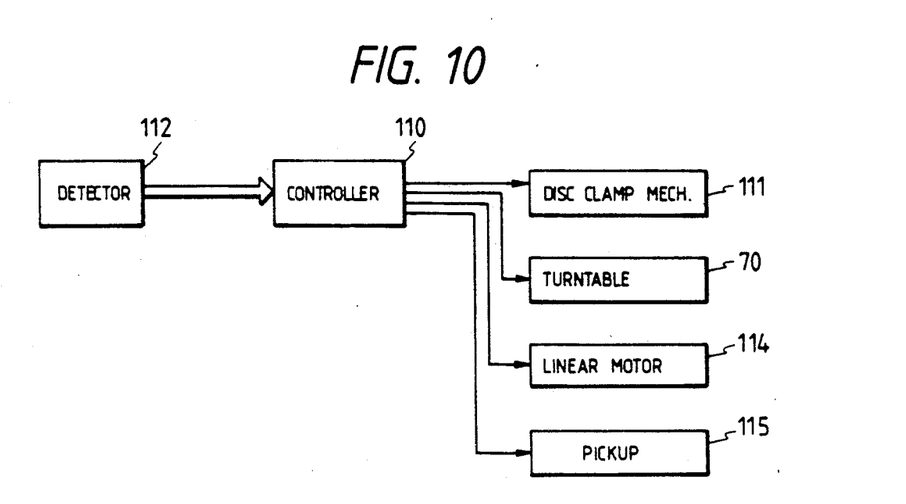
FIG. 10 is a block diagram showing a control system in the disk player.
Figures 11, 12, 13:
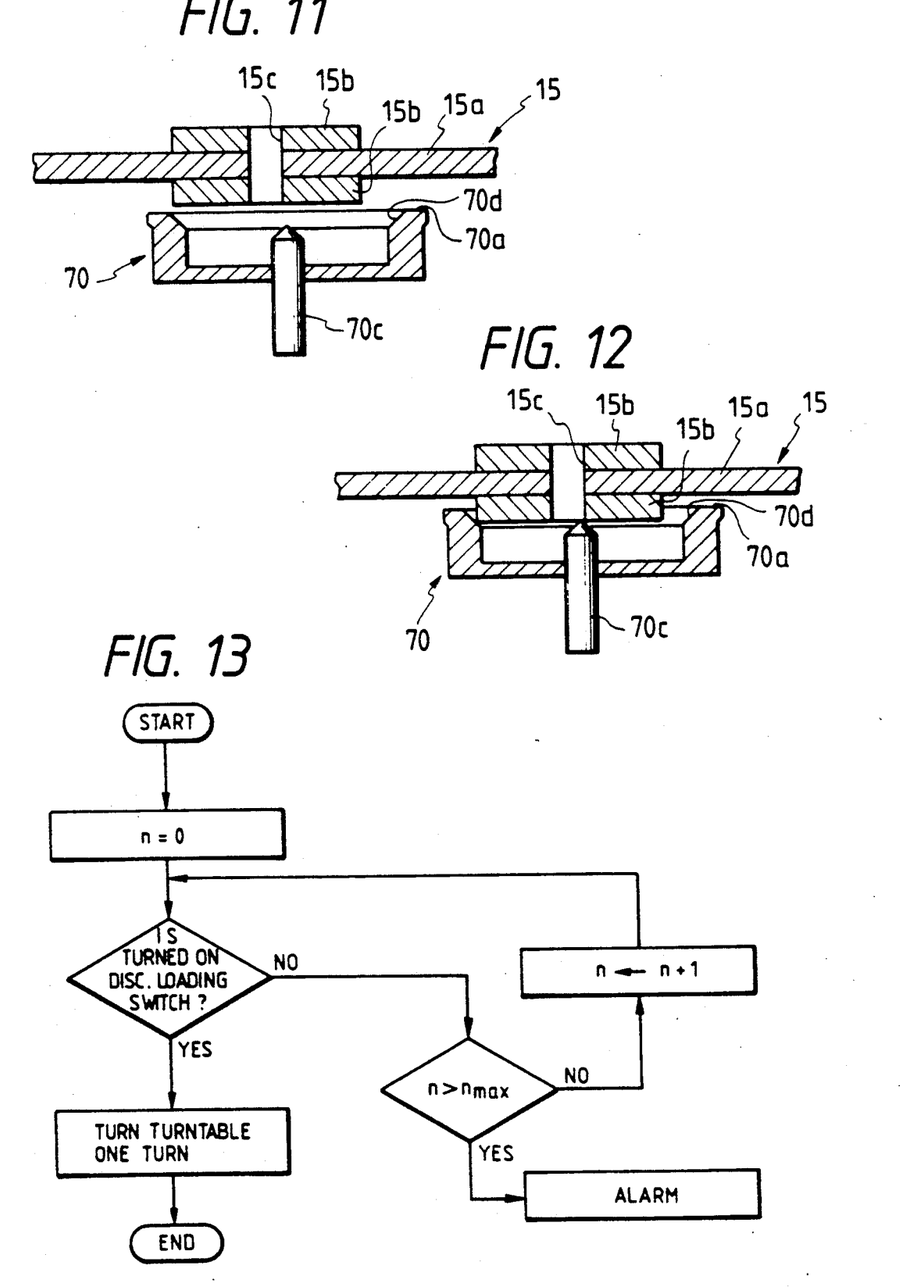
FIGS. 11 through 13 are diagrams for a description of the operation of the disk player.

First, the cartridge 77, accommodating the disk 15, is inserted into the player housing 78 through the slot 80. In response to the insertion of the cartridge 77, the cover 88 of the cartridge 77 is opened with the aid of the lever members 95 and 96, etc., shown in FIG. 9. Under this condition, as shown in FIG. 10, a control section 110 activates the disk conveying mechanism 111 so that the cartridge 77 is conveyed and the disk 15 in the cartridge 77 is placed on the turntable. If, in this operation, the disk 15 is conveyed to a position which is significantly shifted from the predetermined correct position as shown in FIGS. 11 and 12, then the circular hub 15b of the disc 15 is brought into sliding contact with the tapered surface 70d of the turntable 70 whereby the disc is moved towards the spindle 70c.

Thereafter, as shown in FIG. 10, detecting means 112 applies a detection signal to the control section 110 which indicates the fact that the disc 15 will be placed on the turntable 70. In response to the detection signal, the control section 110 operates to turn the turntable, for instance, one revolution and stop it as shown in FIG. 13, whereby the central hole 15c of the disk 15 is completely fitted on the spindle 70c. Under this condition, as shown in FIG. 10, the control section 110 drives the linear motor 114 and the pickup 115, and starts rotation of the turntable 70. Thus, recording data on the disk 15 or reproducing data therefrom is started.

Upon completion of the data recording or reproducing operation, the above-described operations are carried out in the reverse order, and the cartridge is returned.

As was described in detail, in the disk player according to the invention, the fixing means which fixedly secures the holding member to the supporting mechanism comprises: a first rack provided on the holding member extending in the direction of movement of the holding member; a second rack extending in the direction of movement of the holding member and having a tooth bearing face confronting a tooth bearing face of the first rack; and two leaf springs cantilevered to the supporting mechanism in such a manner that the leaf springs are spaced from each other in the direction perpendicular to the tooth bearing faces of the first and second racks and the free end portions thereof hold the second rack.

That is, the fixing means is simple in construction comprising only the pair of leaf springs and the two racks, and therefore not only the number of components but also the manufacturing cost can be reduced.

The two leaf springs thus arranged form the parallel maintaining mechanism as was described above, whereby the second rack is moved while its tooth bearing face is maintained parallel with that of the first rack. Therefore, the teeth of the first and second racks are engaged with each other smoothly and positively so as to secure the moving member.

What is claimed is:

1. A disk player for playing a disk, comprising a holding member for holding a pickup, a supporting mechanism for movably supporting said holding member, drive means for driving said holding member, and fixing mean for fixedly securing said holding member to said supporting mechanism when the disk player is not in a playing operation or a recording operation, said fixing means comprising:

a first rack disposed on said holding member and extending in the direction of movement of said holding member, said first rack having a tooth bearing face with a plurality of teeth;

a second rack fixedly extending in the direction of movement of said holding member and also having a tooth bearing face with a plurality of teeth for covering the entire stroke of movement of said holding member and confronting the tooth bearing face of said first rack; and leaf spring means contilevered to said supporting mechanism for holding said second rack.

2. The disk player according to claim 1, wherein said second rack is disengageable from said first rack.

3. The disc player according to claim 1, wherein said leaf spring means includes two leaf springs spaced from each other in a direction perpendicular to the tooth bearing faces of said first and second racks which extend in said direction of movement of said holding member, said leaf springs having free end portions for holding said second rack.

* * * * *